United States Patent
Nasman et al.

(10) Patent No.: US 6,868,310 B2
(45) Date of Patent: Mar. 15, 2005

(54) PREDICTIVE FAILURE SCHEME FOR INDUSTRIAL THIN FILMS PROCESSING POWER DELIVERY SYSTEM

(75) Inventors: Kevin P. Nasman, North Chili, NY (US); Aaron T. Radomski, Wyoming, NY (US)

(73) Assignee: ENI Technology, Inc., Rochester, NY (US)

( * ) Notice: Subject to any disclaimer, the term of this patent is extended or adjusted under 35 U.S.C. 154(b) by 547 days.

(21) Appl. No.: 09/827,408

(22) Filed: Apr. 6, 2001

(65) Prior Publication Data

US 2002/0198627 A1 Dec. 26, 2002

(51) Int. Cl.[7] .......................... G05D 17/00; G05B 11/01
(52) U.S. Cl. ........................ 700/291; 700/110; 700/286
(58) Field of Search ................................ 700/286, 292, 700/293, 22, 48, 49, 50, 291, 110

(56) References Cited

U.S. PATENT DOCUMENTS

| | | | | |
|---|---|---|---|---|
| 5,734,575 A | * | 3/1998 | Snow et al. ................ | 700/286 |
| 6,163,740 A | * | 12/2000 | Beltracchi .................. | 700/286 |
| 6,490,506 B1 | * | 12/2002 | March ....................... | 700/286 |

* cited by examiner

Primary Examiner—Leo Picard
Assistant Examiner—Charles Kasenge
(74) Attorney, Agent, or Firm—Harness, Dickey & Pierce, P.L.C.

(57) ABSTRACT

A predictive failure system for a power delivery system. The power delivery system includes a number of modules which are interconnected to a system monitor. The system monitor collects data on operating parameters of each module and environmental parameters. The system monitor analyzes the data in order to define conditions based upon the parameters. The parameters are then applied against a set of rules to determine whether a warning or a fault indicator should be generated. The system monitor may be implemented locally as part of the power delivery system or may be located remotely from the power delivery system to enable off site data collection and analysis.

40 Claims, 5 Drawing Sheets

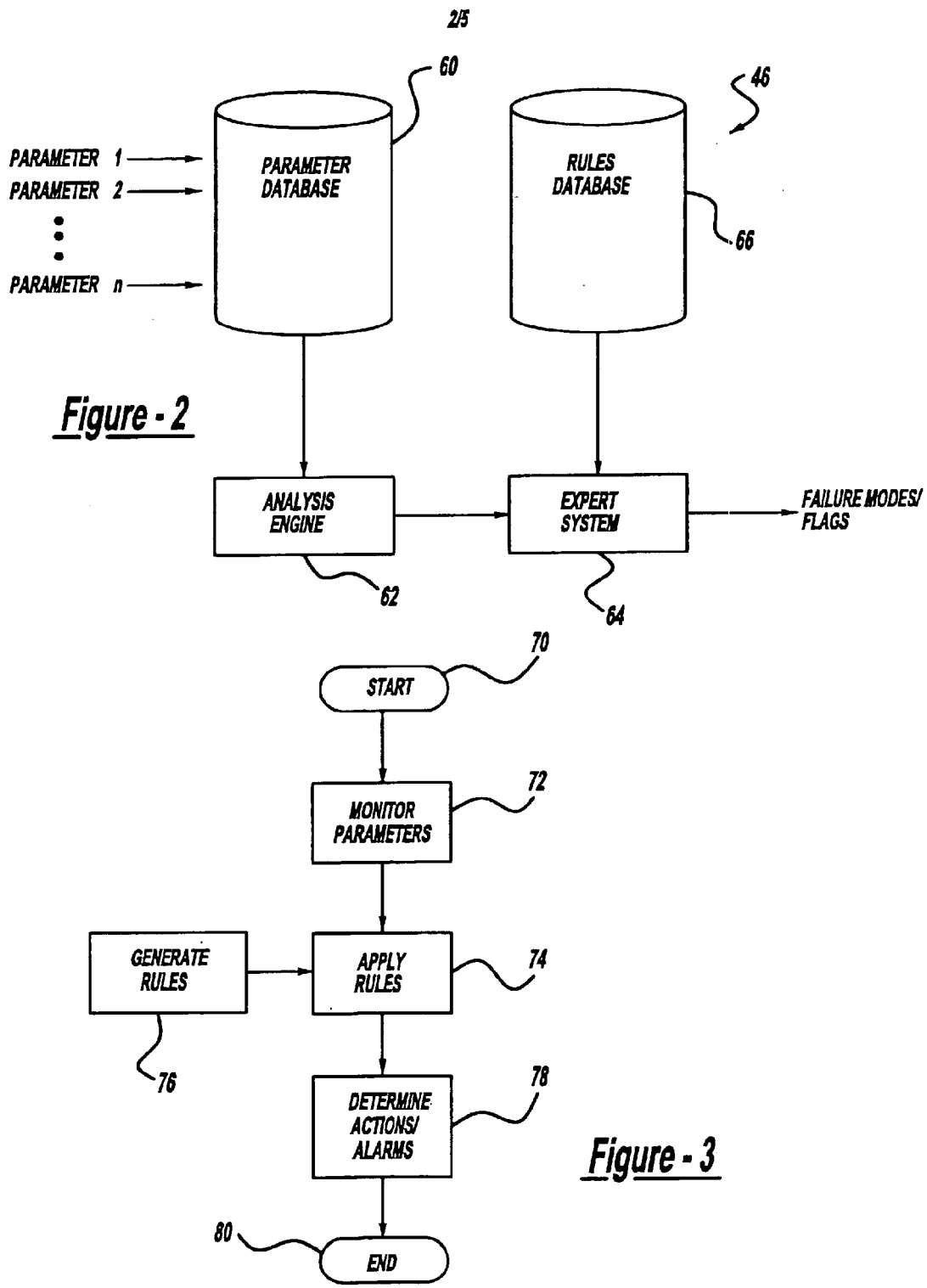

PREDICTIVE FAILURE SCHEME FOR INDUSTRIAL THIN FILMS PROCESSING POWER DELIVERY SYSTEM

FIELD OF THE INVENTION

The present invention relates to predictive failure for power supplies and, more particularly, to monitoring parameters of a power supply and analyzing those parameters in order to generate warning indicators.

BACKGROUND OF THE INVENTION

Material processing applications, such as plasma deposition and sputtering through the utilization of the plasmas, are well known. These processes require power delivery systems. The power delivery system generally provides a radio frequency (RF) or high direct voltage direct current (DC) power signal coupled to a plasma chamber. In such an application, inconsistency or failure of a power supply during a material processing session can cause the entire loss of the material in process. Such a loss can be expensive and highly undesirable.

No power delivery system for semiconductor processing applications presently monitors operating parameters of the power delivery system in order to predict maintenance requirements and to avoid power delivery system failure. The lack of any on-the-fly monitoring system for predicting maintenance and failures makes it necessary to merely schedule maintenance of the power delivery system in order to prevent such mid-session power delivery system inconsistencies or failure. Accordingly, necessary maintenance may not occur in a timely manner, resulting inconsistent operation or failure of the power delivery system.

Present power delivery systems also do not provide any way for the manufacturer, distributor, or plant or customer to monitor operation of the power delivery system or to build a historical database of power supply information at a location remote from the power delivery system location. Remote monitoring and building a historical database of power delivery system information provides valuable data for scheduling required maintenance of the remote power delivery system. Remote monitoring and building a database may also enable data analysis applicable to similarly installed power delivery systems, and assist in designing future power delivery systems.

Because no present power delivery system enables remote monitoring, analysis, and data collection, power delivery systems require technicians to travel to the installation to do on-site service. Alternatively, customers often return a failed power delivery system to the manufacturer service. Having trained technicians perform on-site service can be costly to the customer. On the other hand, because the operation of power delivery systems greatly depends upon the environment, removing and returning a power delivery system for service often results in the power delivery system passing all the tests performed at the service center. Further, no on-site operating data usually accompanies the returned power delivery system.

Monitoring power delivery system performance using a host controller proves inadequate because of speed limitations of the host controller. Thus, critical information for analysis often must be obtained directly from the power delivery system independently from the host controller. Present power delivery systems also do not allow for remotely configuring a power delivery system for diagnostic tests. This requires that either a technician travel to the power delivery system site or that the service center step the manufacturer through configuring the unit for diagnostic test. Because such a configuration process can be both difficult and time consuming, the customer may commit errors during configuration, rendering the test of limited value. Because these difficulties often necessitate a qualified technician to travel to the power delivery system site, response times for servicing problem units requires additional downtime of the material processing system.

Because many material processing applications are considered highly secret by the material processors, material processors are reluctant to transmit information to remote sites, even the manufacturer, in order to protect critical process information. On the other hand, if a service technician must travel to the power delivery system site in order to set up and oversee an appropriate data logging/analysis system, this increases the cost and further slows the repair process.

Thus, it is desirable to provide a system for monitoring a power delivery system and a system for remotely monitoring a power delivery system.

SUMMARY OF THE INVENTION

This invention is directed to a method of monitoring a power delivery system. The method includes the steps of providing a power generator which generates an output power, a sensor for monitoring the output power generated by the power generator, and a controller for receiving input from the sensor and providing control signals to vary operation of the power generator. The method also includes the step of monitoring a plurality of parameters associated with the power delivery system. A set of rules is applied to the parameters to determine a state of operation of the power delivery system.

This invention is also directed to a method of remotely monitoring a power delivery system. The method includes the steps of providing a power generator which generates an output power, a sensor for monitoring the output power generated by the power generator, and a controller for receiving input from the sensor and providing control signals to vary operation of the power generator. At least one of the plurality of parameters is communicated to a remote site. Plurality of parameters associated with the power delivery system and communicated to the remote site are monitored. A database at the remote site stores the plurality of parameters communicated to the remote site.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a block diagram of a power delivery system monitor arranged in accordance with the principles of the present invention;

FIG. 3 is a flow diagram for monitoring operation of the power delivery system monitor;

DETAILED DESCRIPTION OF THE PREFERRED EMBODIMENTS

The following description of the preferred embodiment(s) is merely exemplary in nature and is in no way intended to limit the invention, its application, or uses.

Figure 1:
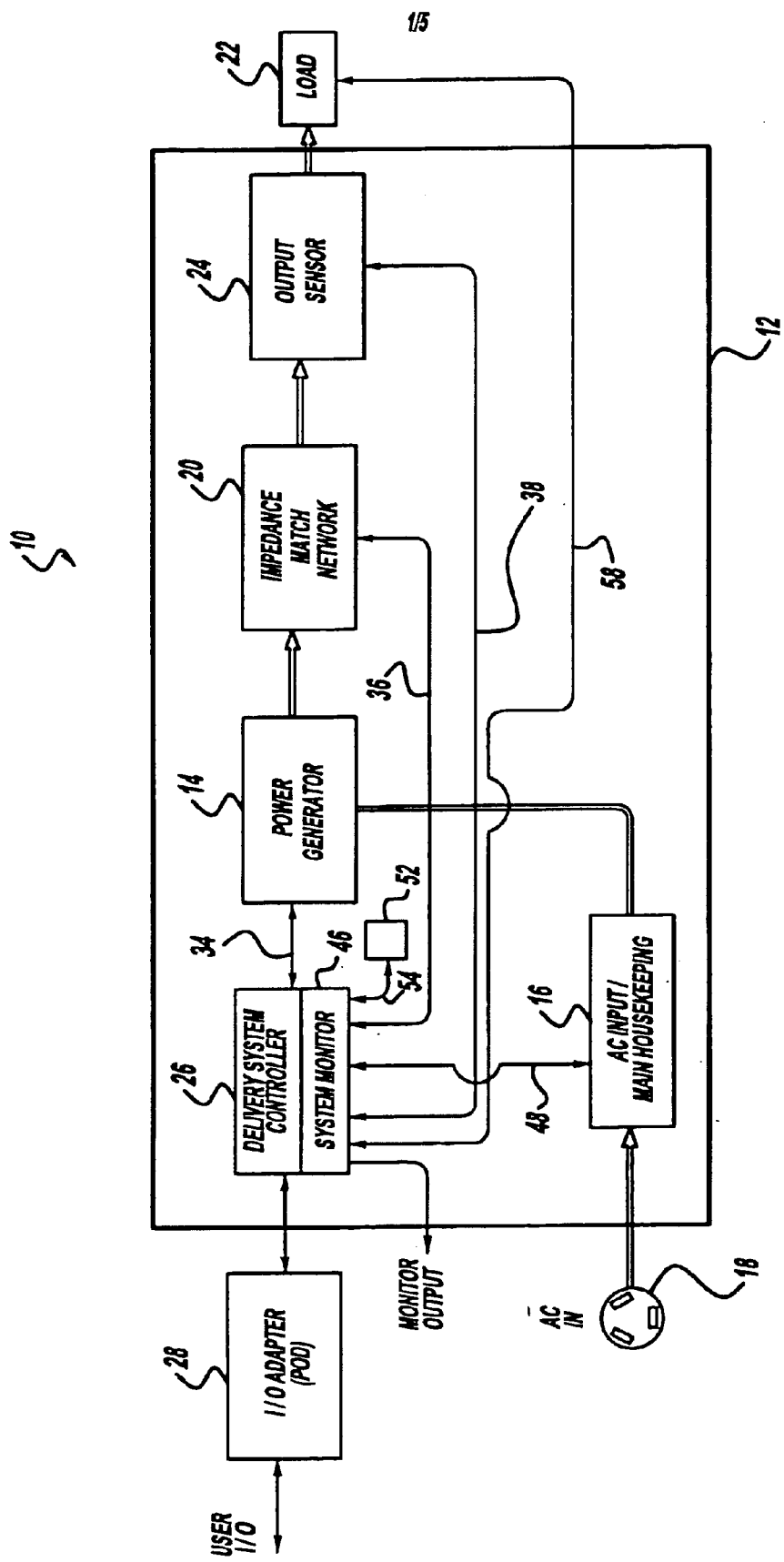
FIG. 1 is a block diagram of a power delivery system arranged in accordance with the principles of the present invention.

FIG. 1 depicts a block diagram of power delivery system 10 arranged in accordance with the principles of the present invention. Power delivery system 10 includes a delivery system 12 which includes a power generator or power generator module 14. Power generator 14 receives an input signal, such as an alternating current (AC) input signal from AC input/main housekeeping module 16. Power is received by AC input 16 through an AC receptacle 18. AC input 16 conditions the AC signal for application and input to power generator 14. Power generator 14 is embodied as any device which converts an input signal to a predetermined output signal. AC input 16 also converts the AC input signal to a low level direct current (DC) signal for powering logic level components.

Preferably, power generator 14 is configured to output a radio frequency (RF) signal by converting the AC input to a predetermined DC voltage. A pair of switches, such as a push pull amplifier configuration, in turn converts the DC voltage to an RF output voltage which may be filtered prior to output from power generator 14. The operation of power generator 14 may be any type of conventional operation known in the art, including single and two stage conversions.

Power generator 14 generates an output voltage to an impedance match network or module 20 prior to application to a load 22. Power generator 14 includes an internal output sensor which determines the output of power generator 14. Impedance match module 20 typically provides a variable impedance between power generator 14 and load 22 in order to maintain a predetermined impedance at the output of power generator 14, typically 50 ohms.

An output metrology module or output sensor 24 receives the power output from impedance match network 20 prior to application to load 22. Output sensor 24 measures predetermined parameters found in the output from impedance match network 20. For example, output sensor 24 may measure one or a plurality of parameters including voltage, current, power, frequency, phase, or other parameters of interest in generating a power output to load 22.

Both impedance match network 20 and output sensor 24 generate data signals to delivery system controller 26. Delivery system controller 26 receives data from one or both impedance match network 20 and output sensor 24. Delivery system controller 26 receives the data and generates at least one of a control or data signal to power generator 14, as will be described in greater detail herein. Delivery system controller 26 may also generate control signals to or exchange data with each of match network 20, output sensor 24, load 22, and AC input 16. Delivery system controller 26 also exchanges data with an input/output (I/O) adapter or adapter module 28, also known as a peripheral optional device (POD). I/O adapter 28 enables communications with external devices, such as an overall system controller, plasma system controller, test module, user input module, or other modules which may desire to share data with or control operation of delivery system 12.

Communications occur between various modules of power delivery system. More specifically, delivery system controller 26 functions as a common controller core which interconnects system and subsystem modules via high speed communications links 34, 36, 38, 48, and 58. These communications inks enable single or bidirectional communications as design criteria dictates. Communications link 34 interconnects power generator 14 with delivery system controller 26 to enable high speed, bidirectional communications. Communications link 36 interconnects impedance match network 20 with delivery system controller 26 as required. Communications link 38 interconnects output sensor 24 with delivery system controller 26 as required. Communications link 48 interconnects AC input 16 with delivery system controller 26. Communications link 58 interconnects delivery system controller 26 with load 22.

Delivery system controller 26 communicates with each of power generator 14, impedance match network 20, output sensor 24, load 22, and I/O adapter 28 using either a direct signal connection or a digital communications protocol, which preferably is a high speed digital communications protocol. The protocol may include error detection and correction to improve reliability of communications between system controller 26 and each device with which power controller 26 exchanges data. Such a protocol enables control and feedback signals to have a very high dynamic range compared to traditional analog methods for control and measurement. To effect the digital communications, each module described herein may have a digital communications port, and each communications link functions cooperatively to define a digital interface between the connected modules.

In a particular feature of the subject invention, delivery system controller 26 also includes a system monitor 46, as will be described herein in greater detail. It should be understood that delivery system controller 26 is shown in FIG. 1 as including system monitor 46. Alternatively, one skilled in the art will recognize that system monitor 46 may alternatively be configured as a module separate from delivery system controller 26. System monitor 46 provides a fast detection system for power delivery system 10.

In addition to the inputs described above with respect to power generator 14, impedance match network 20, output sensor 24, load 22, and AC input 16, additional inputs from various sensors, such as the output sensor of power generator 14, may be applied to delivery system controller 26 in order to provide system monitor 46 with sufficient inputs in order to analyze operation of power delivery system 10. Power delivery system 10 may also include environmental sensors, such as environmental sensor 52, which connects to delivery system controller 26 via communications link 54. Communications link 54 may operate similarly as described above with respect to communications link 34, 36, 38, 48, and 58. That is, communications link 54 may transmit either digital or analog signals, or a combination of digital and analog signals, to effect single and bidirectional communications as design criteria dictate.

As shown herein, system monitor 46 monitors various parameters which characterize operation of power delivery system 10. System monitor 46 generates a monitor output signal, either analog or digital, which provides information regarding the operation power delivery system 10. Such information may include recommended maintenance, error detection and proposed correction, failure mode warnings, or other information related to power delivery system 10.

FIG. 2 depicts a block diagram of system monitor 46 of FIG. 1. System monitor 46 receives parameters via the above-described communications links. Parameter 1, parameter 2, and parameter n are input to parameter database 60. The parameters input to system monitor 46, by way of example, may include system power conversion efficiency, subsystem power conversion efficiency, operating hours, number of output actuations, component temperatures, ambient air temperatures, ambient water temperatures, humidity, dust or contamination factors, communications link error rates, gain characteristics, shift in gain characteristics, response characteristics, shift in response characteristics, drift in the AC input line, transients in the AC input line, fatigue data including the number of contactor cycles, electro-mechanical device cycling, thermal cycling of power components, load transients such as arcs, feedback integrity from system sensors, or other parameters or trends that may be useful in defining operation of power delivery system 10. Preferably, parameter database 60 is implemented in a neural network. The neural network of parameter database 60 creates and maintains a historical log of the parameter data input to parameter database 60 and compresses the parameter data.

Parameter database 60 stores the data and outputs the data to an analysis engine 62. Analysis engine 62 may be implemented using a neural network, fuzzy logic, or other artificial intelligence systems. As will be described in greater detail herein, analysis engine 62 analyzes parametric data received from parameter database 60 and determines whether the same is within a predetermined range or determines whether the individual or groupings of parametric data suggest desirable or undesirable conditions.

Analysis engine 62 outputs a number of conditions to an expert system 64. Expert system 64 receives the conditions from analysis engine 62 and applies the conditions to rules received from rules database 66. Rules database 66 contains one or a number of rules which, when applied to the conditions received from analysis engine 62 in expert system 64, defines operation of power delivery system 10 and generates a warning or fault indicator. Expert system 64 outputs one or a number of warnings, fault indicators, or failure mode data or flags which indicate the state of power delivery system 10 or a portion of power delivery system 10. The rules stored in rules database 66 may be generated and periodically updated via a neural network or fuzzy logic system in accordance with various design considerations. Alternatively, the rules stored in rules database 66 may be defined by the system designer, and may be fixed until modified by the system designer. The rules may be applied using traditional software techniques, such as IF-THEN statements, or may use artificial intelligence, such as expert systems, fuzzy logic, decision trees, fault trees, or neural networks.

In a preferred embodiment, the rules stored in rules database 66 are implemented to linguistically define operation of power delivery system 10. For example, rather than specifically defined limits, fuzzy descriptions of the rules, such as "decreased", "high", "normal", and "mismatched" are used. When a mathematical function defines an output parameter, variation in that function are preferably characterized as "increased" or "decreased" to ensure that some other variable did not cause the change. For example, if the efficiency drops, but the load impedance Z and power did not change, system variations may have caused the efficiency change. On the other hand, if the efficiency changed, but the output power was reduced, the efficiency change could be caused by the operating point change, rather than system variation. By way of example, several rules are shown below to demonstrate the fuzzy nature of the rules.

| | |
|---|---|
| IF | (Power Amplifier (PA) efficiency has decreased) AND ((at least one of the power transistors (PT) temps is high) OR (the PT currents are mismatched) |
| THEN | Possible PA problem. |
| IF | (PA efficiency has decreased) AND ((at least one of the PT temps is high) OR (the PT currents are mismatched)) AND (Driver current is low) |
| THEN | Possible driver problem or excitation board problem. |
| IF | (Bulk ripple voltage has increased) AND ((PA efficiency has not changed) AND (Bulk voltage has not dropped) |
| THEN | Bulk caps may be degrading/drying out. |
| IF | (Modulator efficiency has decreased) AND (Bulk voltage has not increased) AND (PA efficiency has stayed the same) |
| THEN | possible modulator problem. |
| IF | (Bulk capacitor charging time has increased significantly) |
| THEN | possible modulator leakage problem. |
| IF | (Bulk capacitor charging time is approximately zero) |
| THEN | possible welded contactor. |
| IF | (Bulk capacitor discharge time is infinite) |
| THEN | Possible welded contactor. |
| IF | (Ambient temp has not changed) AND (PA transformer temp has increased) AND (PA efficiency has not changed) AND (unit is at thermal steady-state) |
| THEN | Possible PA transformer problem. |
| IF | (PT temps have increased) AND (PT temps are matched) AND (inlet water temp has not changed) AND (PA efficiency has not changed) |
| THEN | Possible decrease in water flow. |
| IF | (PT temps have increased) AND (PT temps are mismatched) AND (inlet water temp has not changed) AND (PA efficiency has not changed) |
| THEN | Possible PT heat sinking problem. |
| IF | (PT temps are mismatched) AND (PA efficiency has not changed) AND (PT currents are matched) |
| THEN | Possible PT temp sensor problem (ok to keep running). |
| IF | (PT currents are mismatched) AND (PA efficiency has not changed) AND (PT temps are the same) AND (Driver current has not changed) |
| THEN | Possible PA current sensor problem (ok to keep running). |
| IF | (Modulator housekeeping (HK) voltage has dropped) AND (Bulk voltage has not changed) |
| THEN | Possible modulator HK problem. |
| IF | (the bulk voltage brown-out rate has increased) |
| THEN | Possible facility power problem. |
| IF | (the ambient temperature increased) AND (fan(s) are ok) |
| THEN | Possible facility cooling problem. |
| IF | (Communications error rate has increased) AND (modulator HK ripple has increased) |
| THEN | Possible noise problems. |
| IF | (Interlock trip lasted <0.1 ms) |
| THEN | Possible noise on interlock (probably not caused by an electromechanical switch). |
| IF | (modules have significantly different error rates) |

-continued

| | |
|---|---|
| THEN | Possible grounding problem on the high error rate module. |

FIG. 3 depicts a flow diagram for the operation of system monitor 46. Control commences at start block 70 and proceeds to monitor parameters block 72. At monitor parameters block 72, the parameters defining operation of power delivery system 10 are input to parameter database 60. Also at monitor parameters block 72, analysis engine 62 analyzes data received from parameter database 60 and generates conditions which are output to expert system 64. Control then proceeds to apply rules 74. Prior to application of the rules at apply rules block 74, rules are generated at generate rules block 76. Generate rules block 76 generates the rules as described above with respect to rules database 66. The rules are stored in rules database 66. Apply rules block 74 compares the conditions received from analysis engine 62 with the rules received from rules database 66. Control next proceeds to determine action/alarms block 78. At determine action/alarms block 78, maintenance suggestions, warning, fault conditions, and other possible action based on data regarding power delivery system 10 are output from expert system 64. Control then proceeds to end block 80.

Expert system 64 and apply rules block 74 utilizes a database of expected parameter behavior based upon normal operation, operation without failure, and a set of rules for using this data. Because many parameters of power delivery system 10 are affected by external variables such as AC line voltage ambient temperature, and load impedance, rules database 66 and analysis engine 62 must include these effects to prevent false warnings or fault modes. Such external variables can be addressed by creating a system model using a lookup table or empirically determined models based upon measurement data from sample power delivery systems. If actions/alarms block 78 determines that a fault, defined as a serious imminent failure requiring power delivery system 10 to shut down, or warning, defined as an abnormal operation or drift, is indicated, determine action/alarm block 78 states the appropriate action to protect power delivery system 10 and indicates that a subsystem of power delivery system 10 or external utility requires service. This action protects both the power delivery system 10 and the overall customer system in which power delivery system 10 is installed.

As described above, rules database 66 stores rules input to expert system 64. Such rules include both rules and expected values for a given system. With respect to the subject invention, the rules must be defined to prevent warning or failure indications when none actually exists. Two approaches may be implemented to derive the rules and expected values.

A first approach will be referred to as a guard band approach. In the guard band approach, a band is placed around an expected value of a parameter, and a warning or fault indicator is output when the parameter falls outside the predefined band. By way of example, if it is known that the internal ambient temperature of a chassis varies linearly over the normal operating range as a function of the internal power dissipation and external ambient temperature, the normal or fault free ambient temperature can be defined by the following equation (1):

$$T_{int}(T_{amb}, P_{diss}) = T_{amb} + \alpha P_{diss} \quad (1)$$

Where
$T_{int}$ is the expected ambient temperature;
$T_{amb}$ is the external ambient temperature;
$\alpha$ is a proportionality constant based on empirical data; and
$P_{diss}$ is the calculated heat dissipation, which is determined using sensor data.

Rules database 66 may store the expected behavior of the internal ambient temperature in lookup table or calculate this temperature ad needed. By placing a guard band, such as ±10% as a threshold for a warning or ±20% as a threshold for a fault, around the internal ambient temperature, expert system 64 generates a warning when the temperature falls outside either the warning or fault guard bands.

As an alternative to the guard band approach, a physics-of-failure approach can be used to determine rules for rules database 66 as a metric for when a fault or warning operating condition exists. When the physics-of-failure approach indicates the possibility of component or subsystem has a high probability failure, appropriate flags and actions can be taken.

Electronic component failure can be modeled using chemical reaction or material diffusion models. Electro-mechanical component failure modes are usually based on a mean cycles to failure (MCTF) model. Thermal fatigue models of solder joints and semiconductor die attachment use a combination of temperature difference ($\Delta T$) and cycles to failure.

By way of a specific example, parameters such as temperature and efficiency, which may be used to estimate temperature, provide sound indicators of system performance. An Arrhenius relation describes an exponential dependence of chemical reaction rate on temperature. Most electronic component failures result from chemical reactions also know as diffusion phenomenon. The Arrhenius equation defines the acceleration factor, also defined as the increased failure rate, as a result of an increase in component temperature. It may be described as shown below in equation:

$$A = e^{[(\frac{-Ea}{k}) \times (\frac{1}{T} - \frac{1}{Tn})]} \quad (2)$$

where
A is the acceleration factor;
−Ea is the activation energy in electron volts, which varies with the particular failure mechanism;
k is the Boltzmann's constant;
T is the increased temperature value (° K); and
Tn is the normal temperature (° K).

The above-described system generates warning and fault mode indicators prior to their leading to an actual fault. This provides advanced warning to minimize system downtime and reduce the overall cost of ownership. Further, such a system benefits the power delivery system manufacturer by reducing the number of units returned to the manufacturer and later tested to determine that no apparent problem exists with the unit. Further, the system described above reduces the overall failure rate of critical components based on operating conditions.

The above system described with respect to FIGS. 1–3 is shown as operating locally with respect to the power delivery system to be monitored. However, for some applications, such as where the manufacturer or distributor of the power delivery system is located remotely from the customer, a system monitor located remotely from the power delivery system may facilitate service of the power delivery system and enable remote system monitoring as well as remote data collection. As will be described herein, remote system monitoring and data collection capabilities provide greater flexibility by facilitating customer assistance, thereby minimizing downtime, false warranty returns, and customer inconvenience.

Figure 4:
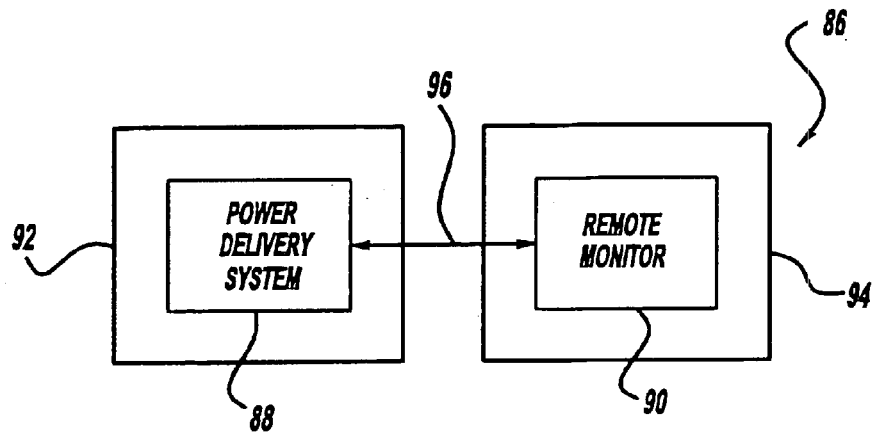
FIG. 4 is a block diagram of a power delivery system and a remote monitor system arranged in accordance with the principles of the present invention.

FIG. 4 depicts a remote monitoring system 86 which includes a local power delivery system 88 and a remote monitor 90. Power delivery system 88 preferably is located at a local site 92, and remote monitor 90 is preferably located at a site remote from power delivery system 88. That is, power delivery system 88 may be located at a customer facility, and remote monitor 90 may be located remotely at a manufacturer facility, such as a field service facility or other manufacturer site, referred to as remote site 94. It should be noted that power delivery system 88 may include a local system monitor, such as described above with respect to FIGS. 1–3. Remote monitor 90 may perform similar functions to system monitor 46 as described above and/or may provide alternate functions, such as remote monitoring and analysis, data collection, and rule generation. As described herein, remote monitor 90 interconnects to power delivery system 88 utilizing a communications link 96, which may be a bidirectional link. This bidirectional link enables remote monitor 90 to receive data from power delivery system 88 and also enables remote monitor 90 to provide data or control commands to power delivery system 88.

Figure 5:
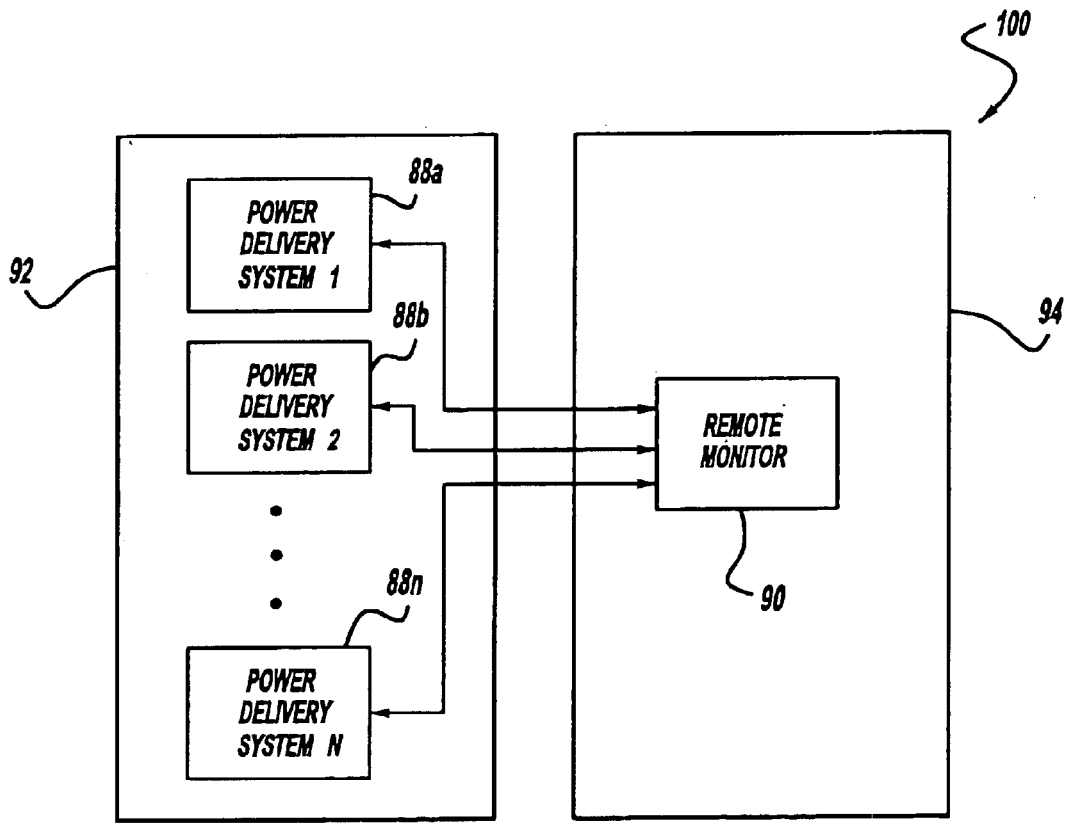
FIG. 5 is a block diagram of a remote power delivery system monitoring system for multiple power delivery systems.

FIG. 5 depicts a block diagram for a remote monitoring system 100 in which remote monitor 90 is located at remote site 94 and communicates with power delivery system 1 88a, power delivery system 2 88b, and power delivery system n 88n. Remote monitoring system 100 operates similarly as described above with respect to remote monitoring system 86. In addition, remote monitor 90 monitors a number of power delivery systems 88a, 88b, and 88c, rather than a single power delivery system. Remote site 94 may be located at a manufacturer installation, such as a customer service or design facility. Remote site 94 may alternatively be located at a customer location, but remotely from the location of power delivery systems 88a, 88b, 88n.

As shown in FIG. 5, remote monitor 90 monitors operation of a plurality of power delivery systems which may be disbursed throughout local site 92. Remote monitor 90 provides either a centralized monitoring location at the customer location, at a service site, some other remote location.

Remote monitor system 90 stores data for the individual power delivery systems 88a, 88b, 88c and optionally stores data collectively for power delivery systems 88a, 88b, 88c. In this manner, a historical data set can be built for the entire power delivery system population, and individual data sets may be stored for monitoring the operation of individual power delivery systems. Alternatively, manufacturing system 90 forms other groupings of data collected for the monitored power delivery systems in real time or as a post processing operation. For example, data from power delivery systems located in proximity to each other at a particular local site may be grouped to provide environmental specific information.

Figure 6:
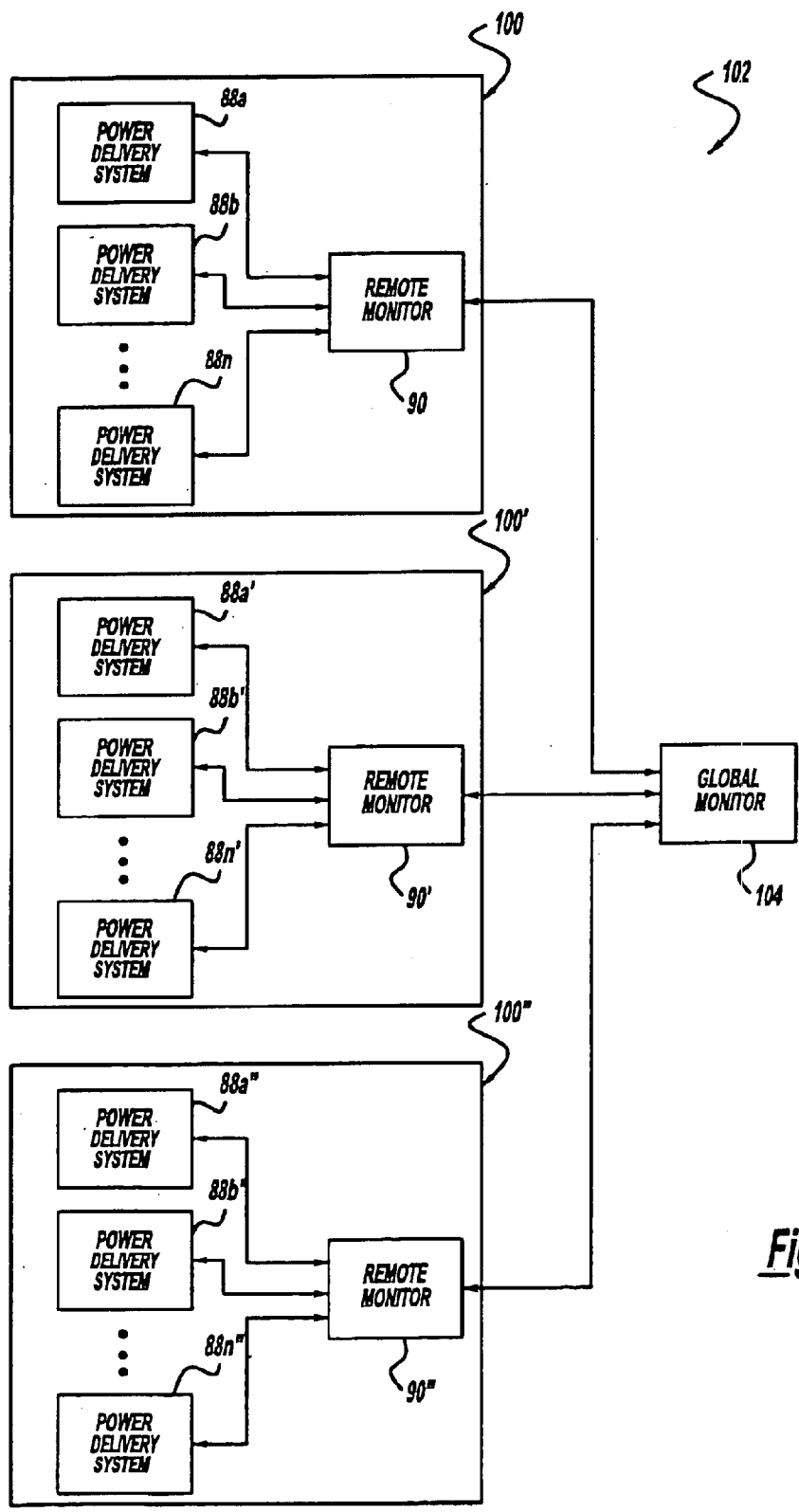
FIG. 6 is a block diagram of a remote monitoring system for monitoring the operation of multiple power delivery systems at multiple local sites.

FIG. 6 depicts an expanded version of remote monitoring systems 86, 100. Remote monitoring system 102 depicts a further extension of the remote monitoring system concept. Each remote monitoring system 100, 100', and 100" includes a plurality of power delivery systems 88a, 88b, 88n, and remote monitor 90. As shown in FIG. 6, like reference numerals are used to designate like components with the addition of a single prime (') or a double prime (") to indicate the respective remote monitoring system.

Each local remote monitoring system 100, 100', 100" outputs data to a global monitor 104. Remote monitoring system 100 may be located at a separate site from remote monitoring system 100', which may be located at a site remote from remote monitoring system 100". Each remote monitor 90, 90', and 90" collects data for the respective power delivery systems with which it is associated. Each remote monitor 90, 90', 90" then outputs data to global monitor 104. It will be understood by one in the art that for any of remote monitoring systems 100, 100', 100", remote monitors 90, 90', 90", may be omitted, as each respective power delivery system 88 may output data directly to global monitor 104. The system of FIG. 6 operates similarly as described above with respect to FIGS. 4–5. Remote monitoring system 102 remotely monitors a global universe of power delivery systems 88 in order to collect data from a cross-section of power delivery systems 88 installed in varying environments, thereby enabling more accurate analysis and rule generation as described above with respect to FIGS. 1–3.

Figure 7:
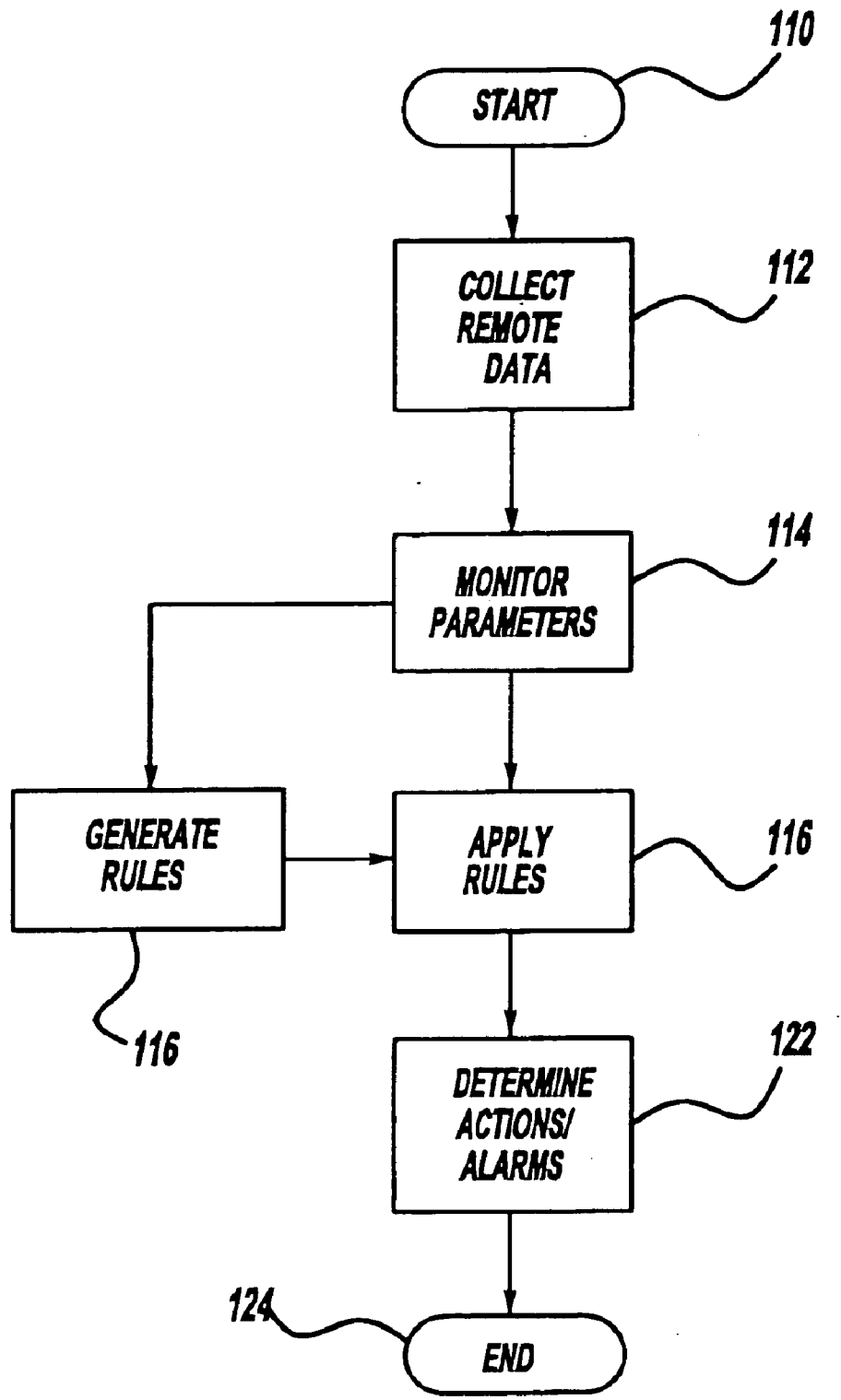
FIG. 7 is a block diagram depicting operation of the remote power delivery monitoring system.

FIG. 7 depicts a block diagram for implementing remote data collection and monitoring system as described above with respect to FIGS. 4–6. Control commences at start block 110 and proceeds to collect remote data at block 112. Block 112 collects the remote data as described above. Following collecting remote data at block 112, control proceeds to monitor parameters block 114. At monitor parameters block 114, the parameters defining operation of power delivery system 88 are input to parameter database 60 of FIG. 2. Also in monitor parameters block 114, analysis engine 62 of FIG. 2 analyzes data received from parameter database 60 and generates conditions which are output to expert system 64. Control then proceeds to apply rules 116. Prior to application of the rules at apply rules block 116, rules are generated at generate rules block 118. Generate rules block 118 generates the rules as described above using either a fuzzy logic or neural network. The rules are stored in rules database 66. Apply rules block 116 compares the conditions received from analysis engine 62 with the rules received from rules database 66. Control next proceeds to determine action/alarms block 122. At determine action/alarms block 122, maintenance suggestions, warnings, fault conditions, and other possible action based data regarding power delivery system 10 are output from expert system 64 in the form of failure modes or flags. Control then proceeds to end block 124.

Expert system 64 and apply rules block 124 utilizes a database of expected parameter behavior based upon normal operation, operation without failure, and a set of rules for using this data. Because many parameters of power delivery system 10 are effected by external variables such as AC line voltage ambient temperature, and load impedance, rules database 66 and analysis engine 62 must include these effects to prevent false warnings or fault modes. Such external variables can be addressed by creating a system model using a lookup table or empirically determined models based upon measurement data from sample power delivery systems. If actions/alarms block 122 determines that a fault, defined as a serious imminent failure requiring power delivery system 10 to shut down, or warning, defined as an abnormal operation or drift, is indicated, determine action/alarm block 122 states the appropriate action to protect power delivery system 10 indicates that a subsystem of power delivery system 10 or external utility requires service. This action protects both the power delivery system 10 and the overall customer system in which power delivery system 10 is installed.

As described above, rules database 66 stores rules input to expert system 64. Such rules include both rules and expected values for a given system. With respect to the subject invention, the rules must be defined to prevent warning or failure indications when none actually exists. The two approaches described above with respect to FIGS. 1–3 may be implemented to derive the rules and expected values.

The remote monitoring systems described in FIGS. 4–7 provides several features and benefits. The remote monitoring system described with respect to FIGS. 5–7 enables a manufacturer or service center to provide expert assistance, monitoring, and analysis of remotely located power delivery systems. A local power delivery system preferably accepts configuration commands provided over a selectable medium, such as an intranet, an internet, a local area network (LAN), or a wide area network (WAN). Preferably, the selected interface converts data transmissions from a specified local protocol to a generally available, external protocol suitable for distance transmission to the remote site. Preferably, the configurable interface encrypts the data to afford suitable data protection. In addition, the configurable interface enables the local user to define what data may be transmitted to the remote site.

The above remote monitoring system provides several additional benefits. Service personnel may remotely monitor a power delivery system while the power delivery system operates at the remote location. In many instances, this may alleviate the need for returning the power delivery system to the manufacturer, as the unit may be diagnosed as installed at the local location by a field technician at a remote location. Each power delivery system need not individually store data, as such data may be stored by the remote monitor. Further, data may be accessed directly from the power delivery system, allowing for fast data acquisition. As described herein, the local site need only allow external access to the unit and define what information may be made available, this significantly reduces requirements for operators at the local site for gathering data. Field service technicians need not make unnecessary trips to perform on-site diagnosis, when such on-site diagnosis may effectively be done remotely by the service technician. Further yet, all data logging and analysis tools need only be located at the remote site, thus eliminating need for additional setup at the local site during installation of the power delivery system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of monitoring a power delivery system comprising the steps of:
   providing a power supply which generates a power signal for operating a plasma chamber, a sensor for detecting at least one parameter of the power delivery system, and a controller for receiving input from the sensor and providing control signals to vary operation of the power supply;
   monitoring a plurality of parameters associated with the power delivery system, including collecting historical data on the parameters, defining at least one condition for at least one parameter based on the historical data, and modeling physical outcomes in accordance with selected parameters; and
   applying a set of rules to the at least one condition to determine a state of operation of the power delivery system.

2. The method of claim 1 further comprising the step of defining a set of rules of operation based upon the parameters associated with the power delivery system.

3. The method of claim 1 further comprising the step of signaling fault conditions of the power delivery system in accordance with an outcome of the step of applying the set of rules to the parameters.

4. The method of claim 1 wherein the step of defining the at least one condition further comprises the step of utilizing one of a fuzzy logic system and a neural network system to define the at least one condition.

5. The method of claim 1 wherein the step of defining the at least one condition further comprises the step of defining a range wherein if a parameter falls within the range, the condition for the at least one parameter is acceptable.

6. The method of claim 1 further comprising providing an expert system to receive the rules and the at least one condition, wherein the expert system indicates a failure mode criteria in accordance with the application of the rules to the conditions.

7. The method of claim 1 wherein the parameters include at least one of the group of power conversion efficiency, operating hours of the power delivery system, output actuation of the power delivery system, component temperature, ambient temperature, humidity, particle contamination, communications link error rate, response characteristic, drift in input power, drift in output power, number of contact cycles, number of thermal cycles, number of transients, feedback, and trends in parameter values.

8. A power delivery system, comprising:
   a power supply receiving an input power and generating a power signal for operating a plasma chamber;
   a sensor for detecting at least one parameter associated with the power delivery system;
   a controller for receiving input from the sensor and providing control signals to vary operation of the power supply; and
   a system monitor, the system monitor receiving as input a plurality of signals that define the parameters associated with the power delivery system, the system monitor including a set of rules of operation and applying the set of rules to the parameters to predict a future state of operation of the power delivery system.

9. The power delivery system of claim 8 wherein the system monitor indicates a warning in accordance with the state of operation of the power delivery system.

10. The power delivery system of claim 8 wherein the system monitor further comprises a database for collecting data on the parameters input to the system monitor.

11. The power delivery system of claim 10 wherein the system monitor further comprises a data analysis module that defines at least one condition for at least one parameter and applies the set of rules to the at least one condition.

12. The power delivery system of claim 11 wherein analysis engine includes one of a fuzzy logic system and a neural network system to define the at least one condition.

13. The power delivery system of claim 11 wherein the analysis engine defines the at least one condition by defining a range wherein if a parameter falls within the range, the condition for the at least one parameter is acceptable.

14. The power delivery system of claim 11 wherein the analysis engine defines the at least one condition by modeling physical outcomes in accordance with selected parameters.

15. The power delivery system of claim 11 further comprising an expert system to receive the rules and the at least one condition, wherein the expert system indicates a failure mode criteria in accordance with the application of the rules to the conditions.

16. The power delivery system of claim 11 further comprising a match network receiving the output power, the match network generating an impedance between the power supply and a load.

17. The power delivery system of claim 11 wherein the parameters include at least one of the group of power conversion efficiency, operating hours of the power delivery system, output actuation of the power delivery system, component temperature, ambient temperature, humidity, particle contamination, communications link error rate, response characteristic, drift in input power, drift in output power, number of contact cycles, number of thermal cycles, number of transients, feedback, and trends in parameter values.

18. A method of monitoring a power delivery system comprising the steps of:

providing a power supply which generates a power signal for operating a plasma chamber, a sensor for detecting at least one parameter of the power supply, and a controller for receiving input from the sensor and providing control signals to vary operation of the power supply;

communicating at least one of the plurality of parameters to a remote site;

monitoring the plurality of parameters associated with the power delivery system and communicated to the remote site; and providing a database at the remote site for storing the plurality of parameters communicated to the remote site.

19. The method of claim 18 further comprising the step of analyzing the data communicated to the remote site to monitor operation of the power delivery system.

20. The method of claim 18 further comprising the step of signaling fault conditions of the power delivery system in accordance with an outcome of the step of applying the set of rules to the parameters.

21. The method of claim 18 further comprising the steps of:

at the remote site, monitoring selected ones of the plurality of parameters associated with the power delivery system; and at the remote site, applying a set of rules to the parameters to determine a state of operation of the power delivery system.

22. The method of claim 21 further comprising the step of at the remote site, defining a set of rules of operation based upon the parameters associated with the power delivery system.

23. The method of claim 21 wherein the step of monitoring the parameters further comprises the step of collecting historical data on the parameters and defining at least one condition for at least one parameter based on the historical data, and the step of applying the set of rules to the parameters applies the set of rules to the at least one condition.

24. The method of claim 21 wherein the step of monitoring the parameters further comprises the step of collecting historical data on the parameters on a plurality of power delivery systems at a plurality of remote sites and defining at least one condition for at least one parameter based on the historical data, and the step of applying the set of rules to the parameter applies the set of rules to the at least one condition.

25. The method of claim 24 wherein the step of defining the at least one condition further comprises the step of utilizing one of a fuzzy logic system and a neural network system to define the at least one condition.

26. The method of claim 24 wherein the step of defining the at least one condition further comprises the step of defining a range wherein if a parameter falls within the range, the condition for the at least one parameter is acceptable.

27. The method of claim 24 wherein the step of defining the at least one condition further comprises the step of modeling physical outcomes in accordance with selected parameters.

28. The method of claim 24 further comprising providing an expert system to receive the rules and the at least one condition, wherein the expert system signals indicates a failure mode criteria in accordance with the application of the rules to the conditions.

29. A system comprising:

a power delivery system including:
a power supply receiving an input power and generating a power signal for operating a plasma chamber;
a sensor for detecting at least one parameter of the power delivery system; and
a controller for receiving input from the sensor and providing control signals to vary operation of the power supply; and a remote monitor located remotely from the power delivery system, the remote monitor receiving data from the power delivery system, the remote monitor including a database for storing the data received from the power delivery system, the data including a plurality of signals that define parameters associated with the power delivery system, the remote monitor predicting a future state of operation of the power delivery system.

30. The system of claim 29 wherein the remote monitor includes a rules database for storing a set of rules of operation of the power delivery system and applying the set of rules to the parameters to determine a state of operation of the power delivery system.

31. The power delivery system of claim 30 wherein the remote monitor indicates a warning in accordance with the state of operation of the power delivery system.

32. The power delivery system of claim 30 wherein the remote monitor further comprises a data analysis module that defines at least one condition for at least one parameter and applies the set of rules to the at least one condition.

33. The system of claim 32 wherein analysis engine includes one of a fuzzy logic system and a neural network system to define the at least one condition.

34. The system of claim 32 wherein the analysis engine defines the at least one condition by defining a range wherein if a parameter falls within the range, the condition for the at least one parameter is acceptable.

35. The system of claim 32 wherein the analysis engine defines the at least one condition by modeling physical outcomes in accordance with selected parameters.

36. The system of claim 29 wherein data exchanged between the remote monitor and the power delivery system is encrypted.

37. The system of claim 29 wherein parameters sent to the remote monitor from the power delivery system may be defined by an operator.

38. A method of monitoring a power delivery system comprising:

providing a power supply which generates a power signal for operating a plasma chamber, a sensor for detecting at least one parameter of the power delivery system, and a controller for receiving input from the sensor and providing control signals to vary operation of the power supply;

monitoring a plurality of parameters associated with the power delivery system; and applying a set of rules to the parameters to determine a state of operation of the power delivery system.

39. The method of claim 38 wherein varying operation of the power supply comprises varying the power signal used in operating the plasma chamber.

40. A power delivery system comprising:

a power supply receiving an input power and generating a power signal for operating a plasma chamber;

a sensor for detecting at least one parameter associated with the power delivery system;

a controller for receiving input from the sensor and providing control signals to vary operation of the power supply; and a system monitor, the system monitor receiving as input a plurality of signals that define the parameters associated with the power delivery system, the system monitor including a set of rules of operation and applying the set of rules to the parameters to determine a state of operation of the power delivery system and adjusting operation of the power supply to adjust the parameters.

* * * * *